United States Patent
Munsell et al.

(10) Patent No.: US 6,663,346 B2
(45) Date of Patent: Dec. 16, 2003

(54) COMPRESSOR STATOR INNER DIAMETER PLATFORM BLEED SYSTEM

(75) Inventors: Peter M. Munsell, Granby, CT (US); Bruce P Biederman, West Hartford, CT (US); Matthew D Nicolson, Glastonbury, CT (US); David P. Dube, Saco, ME (US)

(73) Assignee: United Technologies Corporation, Hartford, CT (US)

( * ) Notice: Subject to any disclaimer, the term of this patent is extended or adjusted under 35 U.S.C. 154(b) by 37 days.

(21) Appl. No.: 10/053,432

(22) Filed: Jan. 17, 2002

(65) Prior Publication Data

US 2003/0133796 A1 Jul. 17, 2003

(51) Int. Cl.[7] .................................................. F01D 9/06
(52) U.S. Cl. ..................................... 416/97 R; 415/115
(58) Field of Search ........................... 416/97 R, 90 R, 416/93 R, 95; 415/115, 114

(56) References Cited

U.S. PATENT DOCUMENTS 4,127,988 A * 12/1978 Becker ........................ 60/726
4,415,310 A * 11/1983 Bouiller et al. ............... 416/95

\* cited by examiner

*Primary Examiner*—Edward K. Look
*Assistant Examiner*—Dwayne J. White
(74) *Attorney, Agent, or Firm*—Bachman & LaPointe, P.C.

(57) ABSTRACT

The present invention relates to a bleed system for use in a gas turbine engine. The bleed system comprises a plurality of blades with each of the blades having an airfoil member and a platform structure. The bleed system further has at least one interblade passage formed by adjacent ones of the airfoil members and an inner endwall formed by the platform structures. A bleed hole is located in the at least one interblade passage for extracting a portion of a fluid passing therethrough. The bleed positioning within the stator passage, both axially and circumferentially, is selected for optimum balance of static pressure and tangential velocity.

17 Claims, 2 Drawing Sheets

COMPRESSOR STATOR INNER DIAMETER PLATFORM BLEED SYSTEM

BACKGROUND OF THE INVENTION

The present invention relates to a bleed system for extracting turbine cooling air from a compressor stage of a turbine engine.

In order to ensure sufficient pressure differential to drive a bleed flow, bleed ports are located aft of a vane trailing edge where the static pressure, which increases with axial distance, is highest. However, in the vicinity of the vane trailing edge, the gas path air has little or no tangential velocity. As a result, the air introduced into an annular cavity radially inboard of the vane platform is accelerated to compressor wheel speed by the compressor disks that axially bound the annular cavity. The acceleration of the air in the annular cavity elevates the air temperature, which is highly disadvantageous from the standpoint of component cooling and engine efficiency.

SUMMARY OF THE INVENTION

It is an object of the present invention to provide a bleed system which takes advantage of the tangential velocity component of the air coming off the trailing edges of upstream blades to avoid a temperature rise.

It is a further object of the present invention to provide a bleed system as above which improves engine efficiency.

The foregoing objects are attained by the bleed system of the present invention.

In accordance with the present invention, a bleed system for a compressor stage of a turbine engine is provided. The bleed system broadly comprises a plurality of blades with each of the blades having an airfoil member extending from a platform structure, a plurality of interblade passages formed by adjacent ones of the airfoil members and adjacent ones of the platform structures, and a bleed hole located in at least some of the interblade passages for extracting a portion of a fluid flowing through each interblade passage. The system further has means for tangentially injecting the extracted air in a direction of rotation.

The invention also relates to a component for use in a turbine engine. The component broadly comprises a blade having an airfoil member with a pressure side and a suction side. The blade further has a platform structure and a bleed hole in the platform structure.

Other details of the bleed system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
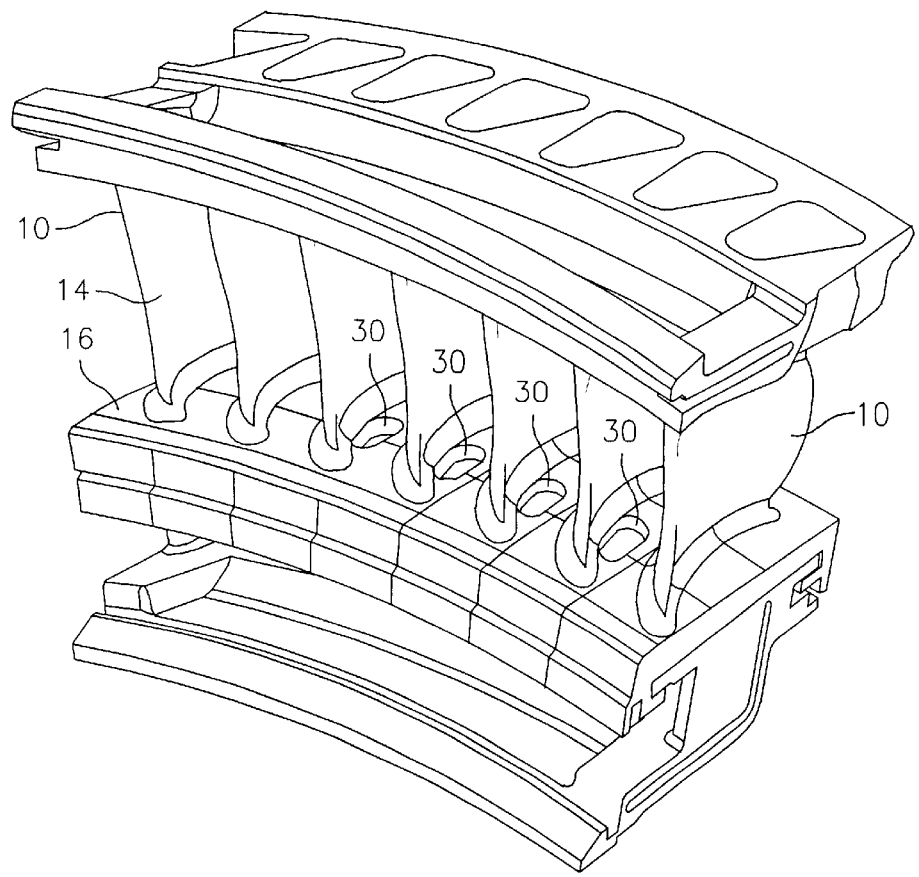
FIG. 1 is a perspective view of a portion of a compressor stage having the bleed system of the present invention.
Figure 2:
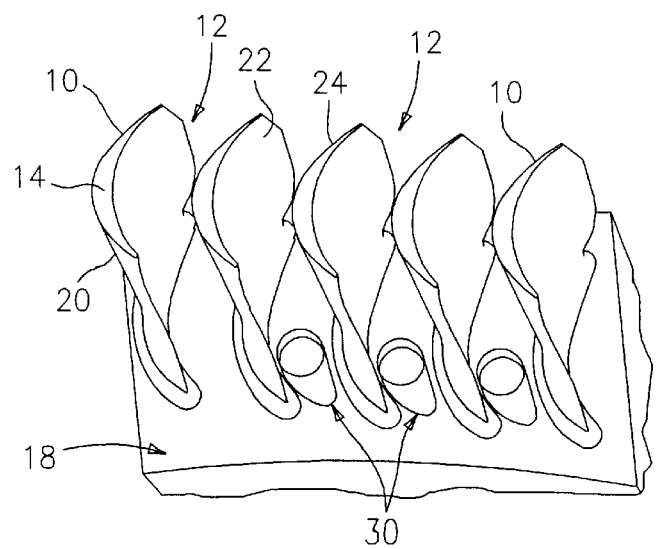
FIG. 2 is a top view of the bleed system of the present invention.

Referring now to the drawings, FIGS. 1 and 2 illustrate a portion of a compressor stage of a turbine engine. As can be seen in these figures, the compressor stage has a plurality of blades or vanes 10, such as stator vanes, with adjacent ones of the blades 10 forming interblade passages 12. Each of the stator blades 10 has an airfoil member 14 and a platform structure 16. The blade platform structures 16 form an inner endwall 18 for the passages 12.

Each airfoil member 14 has a leading edge 20, a pressure side 22, and a suction side 24. Each interblade passage 12 is bounded on one side by the suction side 24 of a first airfoil member 14 and the pressure side 22 of a second adjacent airfoil member 14.

In accordance with the present invention, at least some, if not all, of the interblade passages 12 are provided with a bleed hole 30 for extracting a portion of the fluid passing through the interblade passage. Each bleed hole 30 may be machined into the platform structure 16 of a respective blade 10. Each bleed hole 30 is preferably located closer to the airfoil member 14 having the pressure side 22 than it is to the airfoil member 14 having the suction side 24. By taking advantage of the passagewise pressure gradient, the bleed can deliver cooling air at a pressure level equivalent to stator trailing edge pressure. Further, each bleed hole 30 is located in close proximity to the leading edge 20 of the airfoil member 14 having the pressure side 22. The bleed is located axially in the stator passage at the point where the pressure side bleed pressure is equivalent to stator trailing edge pressure. It is desirable to have the bleed as close to the leading edge as possible to obtain the highest tangential velocity. By positioning each bleed hole 30 in this location, one is able to take advantage of the tangential velocity component of the fluid coming off the trailing edges of upstream blades (not shown).

Figure 3:
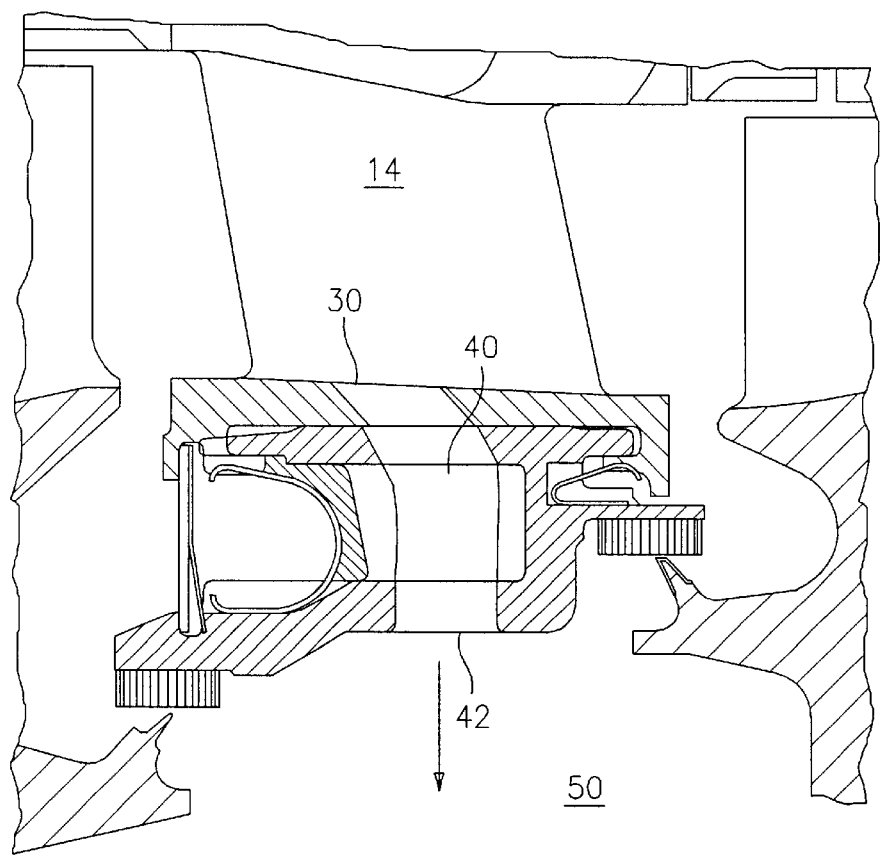
FIG. 3 is a sectional view of the bleed system of the present invention.
Figure 4:
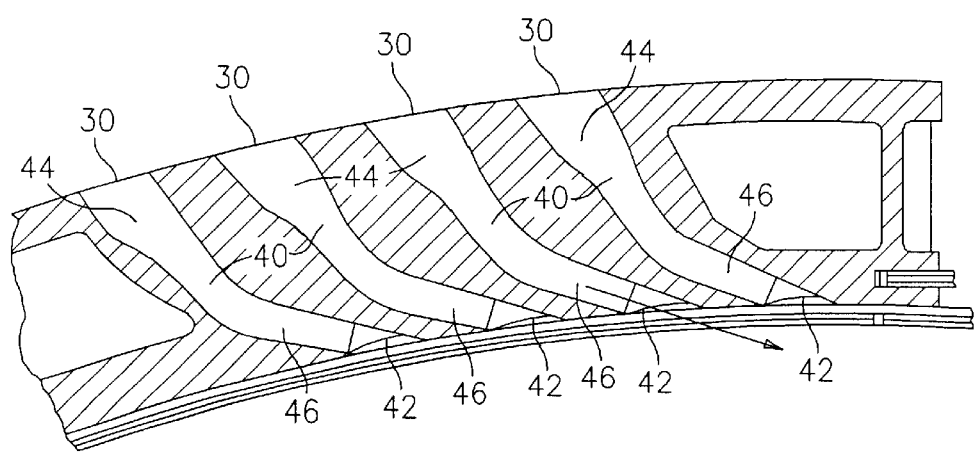
FIG. 4 is another sectional view of the bleed system of the present invention.

Referring now to FIGS. 3 and 4, the bleed system of the present invention further comprises a plurality of passageways 40 internal to the endwall structure. Each passageway 40 is machined into the platform structure of a respective blade 10. Each passageway 40 communicates with a respective bleed hole 30 and terminates in an injection hole 42. As can be seen from FIG. 4, each passageway 40 has a first portion 44 which receives extracted fluid from the bleed hole 30 and a second portion 46 which extends between the first portion 44 and the injection hole 42. The second portion 46 is angled relative to the first portion 44 so that the injection hole 42 is axially offset from the bleed hole 30. The second portion 46 is angled so that bleed fluid is delivered by the injection hole 42 tangentially in the direction of rotation of the compressor rotor into an inner diameter cavity 50. The bleed fluid, usually air, thus introduced into the cavity 50 may be used for a wide variety of purposes such as turbine cooling air. By injecting the bleed fluid in this manner, the injected fluid will be swirled in the direction of rotation to minimize any temperature rise that would otherwise be imparted to the fluid as compressor disks accelerate the air to the disk speed inboard of the compressor flowpath.

The bleed system of the present invention allows an engine designer to use less cooling air which improves engine efficiency, or run hotter without sacrificing durability and component life.

It is apparent that there has been provided in accordance with the present invention a compressor stator inner diameter platform bleed system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A bleed system for a compressor stage of a turbine engine comprising:
   a plurality of blades;
   each of said blades having an airfoil member and a platform structure;
   at least one interblade passage formed by adjacent ones of said airfoil members and an inner endwall formed by said platform structures;
   a bleed hole located in said at least one interblade passage for extracting a portion of a fluid passing therethrough;
   said at least one interblade passage being bounded by a pressure side of a first airfoil member and a suction side of a second airfoil member; and
   said bleed hole being located within said at least one interblade passage closer to said pressure side than to said suction side.

2. A bleed system according to claim 1, wherein each said airfoil member has a leading edge and said bleed hole is positioned near the leading edge of one of the airfoil members forming at least one interblade passage.

3. A bleed system according to claim 1, having a number of interblade passages and a number of bleed holes, said number of bleed holes being fewer than or equal to the number of interblade passages.

4. A bleed system according to claim 1, further comprising means for injecting fluid extracted through the bleed hole tangentially in the direction of rotation of the rotor of said engine.

5. A bleed system according to claim 4, wherein said fluid injecting means comprises a fluid cavity community with said bleed hole and an injection hole.

6. A bleed system for a compressor stage of a turbine engine comprising:
   a plurality of blades;
   each of said blades having an airfoil member and a platform structure;
   at least one interblade passage formed by adjacent ones of said airfoil members and an inner endwall formed by said platform structures;
   a bleed hole located in said at least one interblade passage for extracting a portion of a fluid passing therethrough;
   means for injecting fluid extracted through the bleed hole tangentially in the direction of rotation of the rotor of said engine;
   said fluid injecting means comprising a fluid cavity communicating with said bleed hole and an injection hole; and
   said injection hole being axially offset from said bleed hole.

7. A bleed system for a compressor stage of a turbine engine comprising: a plurality of blades;
   each of said blades having an airfoil member and a platform structure;
   at least one interblade passage formed by adjacent ones of said airfoil members and an inner endwall formed by said platform structures;
   a bleed hole located in said at least one interblade passage for extracting a portion of a fluid passing therethrough;
   means for injecting fluid extracted through the bleed hole tangentially in the direction of rotation of the rotor of said engine;
   said fluid injecting means comprising a fluid cavity communicating with said bleed hole and an injection hole; and
   said fluid cavity having a first portion for receiving extracted fluid from said bleed hole and a second portion terminating in said injection hole for injecting said extracted fluid through said injection hole and wherein said second portion being at an angle with respect to said first portion.

8. A bleed system for a turbine engine comprising:
   a stage having plurality of interblade passages through which a fluid flows;
   each of said passages being formed by a pair of adjacent airfoil members and an inner endwall;
   each of said passages having a bleed hole located between said pair of adjacent airfoil members and in said inner endwall for extracting a portion of the fluid flowing therethrough; and
   each said bleed hole being positioned nearer a first one of said pair of airfoil members than a second one of said pair of airfoil members.

9. A bleed system according to claim 8, wherein each said bleed hole is further positioned in close proximity to a leading edge of said first one of said pair of airfoil members.

10. A bleed system according to claim 8, further comprising means for injecting fluid bled via said bleed holes tangentially in the direction of rotation.

11. A bleed system according to claim 10, wherein said injecting means comprises a plurality of internal passages communicating with said bleed holes and wherein each said bleed hole communicates with a respective internal passage.

12. A bleed system for a turbine engine comprising:
   a stage having plurality of interblade passages through which a fluid flows;
   each of said passages being formed by a pair of adjacent airfoil members and an inner endwall;
   each of said passages having a bleed hole located between said pair of adjacent airfoil members and in said inner endwall for extracting a portion of the fluid flowing therethrough;

means for injecting fluid bled via said bleed holes tangentially in the direction of rotation;

said injecting means comprising a plurality of internal passages communicating with said bleed holes and wherein each said bleed hole communicates with a respective internal passage; and each said internal passage terminating in an injection hole and each said injection hole being axially offset from said bleed hole communicating with said internal passage.

13. A component for use in a turbine engine comprising:

a blade having an airfoil member with a pressure side and a suction side;

said blade further having a platform structure;

said platform structure having two endwalls and two sidewalls; and a bleed hole in said platform structure, said bleed hole being located completely between said endwalls and between one of said sidewalls and said airfoil member.

14. A component according to claim 13, further comprising an internal passage in said blade communicating with said bleed hole.

15. A component according to claim 13, wherein said airfoil member has a leading edge and said bleed hole is located in close proximity to said leading edge.

16. A component according to claim 13, wherein said bleed hole is located adjacent said pressure side of said airfoil member.

17. A component according to claim 13, further comprising said bleed hole having an inlet and an outlet and said outlet being offset from said inlet.

* * * * *

UNITED STATES PATENT AND TRADEMARK OFFICE
CERTIFICATE OF CORRECTION

PATENT NO. : 6,663,346 B2 Page 1 of 1
DATED : December 16, 2003
INVENTOR(S) : Peter M. Munsell et al.

It is certified that error appears in the above-identified patent and that said Letters Patent is hereby corrected as shown below:

Column 3,
Line 2, delete "community" and insert -- communicating --.

Signed and Sealed this

Thirteenth Day of June, 2006

JON W. DUDAS
*Director of the United States Patent and Trademark Office*